United States Patent Office 3,463,702
Patented Aug. 26, 1969

3,463,702
NUCLEAR REACTOR FUEL ELEMENTS
Royston Walter Mastin D'Eye, Penworthan, Preston, and John Vincent Shennan, Fulwood, Preston, England, assignors to United Kingdom Atomic Energy Authority, London, England
No Drawing. Filed June 5, 1967, Ser. No. 643,338
Claims priority, application Great Britain, June 22, 1966, 28,000/66
Int. Cl. G21c 3/16, 3/06
U.S. Cl. 176—68     22 Claims

ABSTRACT OF THE DISCLOSURE

A nuclear reactor fuel element comprising particles of ceramic fissile material, each having a coating of non-fissile ceramic material, the particles being contained in an outer ceramic container and the particles being bonded together in a region about each of their points of contact in the container by an individual bridge of bonding material of high thermal conductivity, the interspaces between the particles being free of bonding material.

BACKGROUND OF THE INVENTION

This invention relates to nuclear reactor fuel elements and is particularly concerned with the production of nuclear reactor fuel elements which are suitable for operation at high temperatures in contact with fluid coolant and which are capable of retaining solid and more particularly gaseous fission products which are produced as a result of irradiation of the fuel elements in a nuclear reactor, whereby contamination of the coolant by fission products is avoided.

One form of fuel element satisfying the above conditions comprises a dispersion of coated particles of fissile material in a solid matrix of non-fissile material. Such a fuel element may be of all ceramic form comprising, for example, particles of uranium carbide having an outer coating of pyrolytically deposited carbon or silicon carbide, the particles being dispersed in a solid matrix of silicon carbide having an outer coating of fuel free silicon carbide.

There is a thermal stress limitation on the temperature at which such a fuel element can be operated. Although the bulk thermal conductivity of such a fuel element is relatively high the temperature arising at the centre of this type of fuel element is always higher than the temperature at the surface. Hence on rise to operating temperature the centre region of the fuel element expands by a greater amount than the surface region and thermal stresses are set up in the surface region which, if too great, can cause cracking of the outer layer of fuel free material.

Another form of fuel element comprises a closed container of ceramic material containing a loose mass of coated particles of nuclear fuel material.

The major advantages of this type of fuel element are higher fuel densities and no surface thermal stress limitations. The higher fuel densities result from the greater packing fraction of coated particles as compared with the type of fuel element having a solid matrix of non fissile material between the coated particles (60 volume percent as compared with 38 volume percent), and the fact that thinner coats are possible on the particles as the coats do not have to be resistant to mechanical damage during manufacture of the fuel element. The thermal stress limitation no longer applies since the fuel core and the outer ceramic container are not homogeneous and thermal expansion of the fuel core relative to the container can be accommodated by deformation in the fuel core itself.

A disadvantage of this type of fuel element lies in the fact that should the outer container be broken, loose fuel particles can escape into the reactor coolant stream and may escape to inaccessible positions in the reactor. Also the low overall thermal conductivity of a loosely aggregated mass of fuel particles results in the particles at the centre of the mass operating at what may be prohibitively high temperatures.

SUMMARY OF THE INVENTION

According to the present invention a nuclear reactor fuel element comprises particles of ceramic fissile material, each having a coating of non-fissile ceramic material, the particles being contained in an outer ceramic container and the particles being bonded together in a region about each of their points of contact in the container by an individual bridge of bonding material of high thermal conductivity the interspace between the particles being free of bonding material.

DESCRIPTION OF THE PREFERRED EMBODIMENTS

In one method for production of a fuel element in accordance with the invention particles of ceramic fissile material which are pre-coated with a layer of non-fissile ceramic material as a fission product retaining envelope are further coated with a deformable layer of metal powder and the particles are then poured into a ceramic container tube and lightly pressed followed by heating the particles in situ to melt the powdered metal coating so that the metal flows by capillary action to the points of contact of the particles to form a bridge of bonding material between the particles at their points of contact.

It is an object of the method to bond the particles together by a bridge of bonding material only at their points of contact and not to completely fill the interspaces between the particles. This end is achieved by provision of a suitable thickness of metal powder overcoating on the particles.

In a specific example of this method, uranium carbide particles pre-coated with pyrolytically deposited carbon and of 650 microns overall diameter are coated with a layer of silicon metal powder. Silicon metal powder of sub 240 mesh (British Standard) is mixed to a slurry with a 50% solution in methyl ethyl ketone of an epoxy resin plus added hardener such as Araldite AY18 and hardener HZ18 (as manufactured by Ciba (ARL) Ltd.)

A slurry is made of 4.13 cubic centimetres of the resin solution with 6.45 grams of the silicon powder, this weight of silicon powder being sufficient for coating 15 cubic centimetres (actual volume) of the particles, which volume of particles will pack orthornombically to a bed volume of 25 cubic centimetres.

The particles are tumbled with the slurry whilst the solvent methyl ethyl ketone is allowed to evaporate and this results in the particles becoming uniformly coated with a layer of the silicon metal powder.

The silicon metal powder coated particles are then poured into a silicon carbide tube the lower end of which is closed by an integral silicon carbide end cap. The particles are hand pressed in the tube to deform the coatings of silicon metal powder so that the particles make point to point contact at their pyrolytic carbon coatings, the silicon metal powder being forced out from between the particles at their points of contact by the pressing operation. The silicon carbide tube containing the particles is then heated at 350° C. in air to drive off the resin and the methyl ethyl ketone from the silicon metal powder coatings. The tube containing the particles is then heated to a temperature of 1750° C. for five to thirty minutes to melt the silicon metal powder so that the molten silicon moves by capillary action to form a bridge of bonding material between the particles at their points of contact. Also during this heating stage a quantity of silicon carbide is formed at the points of contact of the particles by reaction between the pyrolytic carbon coating of the particles and the silicon metal. Thus in this case the bridge of bonding material formed between the particles comprises a mixture of silicon carbide and silicon metal. Other metals such as zirconium, niobium, or molybdenum may be used as the bonding metal. In general the bond may be provided by the metal alone, as in the case where the metal does not react with the coating of fission product retaining ceramic material on the particles, or as in the case of the specific example given above a metal may be chosen which will react with the coating of fission product retaining ceramic material on the particles so as to form a duplex ceramic/metal bond.

As a further step in the process a wholly metal bond or any remaining metal in the bond may be converted to a ceramic of the metal by heating in an atmosphere of a suitable gas. For example in the case of particles bonded together by silicon metal the filled tube may be heated in nitrogen, initially at 1250° C. the temperature then being raised in 50° C. steps to 1400° C. so that the silicon metal is converted to silicon nitrile ($Si_3N_4$).

After bonding of the particles in the silicon carbide tube the tube is then closed by the formation of an integral silicon carbide end cap. End capping may be carried out in the following manner.

A mix is prepared from the following constituents:

(a) 100 grams of 60 mesh (British Standard) alpha silicon carbide powder.
(b) 25 grams of colloilal graphite (for example the material D.AG 521 as supplied by Acheson Colloids Ltd.
(c) 33 grams of the ceramic binder material "Cranco" (Registered Trademark of Imperial Chemical Industries Ltd.) which contains 32% by weight of polybutylmethacrylate, 32% by weight of xylene, 6% by weight of dibutyl pthalate, balance acetone.
(d) 20 cubic centimetres of methyl ethyl ketone diluent.

The above constituents are slurried and vacuum dried until all the solvent has been removed. The solvent removed is the original methyl ethyl ketone diluent of the slurry and the xylene and acetone constituents of the "Cranco." Solvent removal is achieved when a final weight of 137.5 grams is achieved in the mix.

The dried mix is then sieved through a 100 mesh (British Standard) screen to form granules and the granules are compacted into a cylindrical end plug by die pressing at 20 tons per square inch. An end plug slightly larger in diameter than the bore diameter of the silicon carbide tube is produced so that the end plug is a tight force fit in the end of the silicon carbide tube. After plugging the end of the siilcon carbide tube with the green end plug the tube is suspended with the plugged end downwards in a high frequency induction furnace containing a crucible holding silicon metal. The furnace is evacuated and the tube is heated to 1600–1700° C. and left for four hours to de-gas. The tube is then lowered so that the plugged end is brought into contact with molten silicon in the crucible and the silicon metal infiltrates the green end plug by capillary action. The silicon metal reacts with the carbon in the green end plug and converts the carbon to beta silicon carbide which binds the original silicon carbide grains of the end plug together and also bonds the end plug in the end of the tube. The above method of end capping may also be used for closing the first end of the silicon carbide tube before filling the tube with the coated particles.

Fuel elements comprising a dispersion of coated particles of fissile material in a solid matrix of non fissile material although having good thermal conductivities (for example a 38 volume percent dispersion of 620 micron diameter pyrolytic carbon coated uranium carbide particles in a solid matrix of silicon carbide has a thermal conductivity of 0.2 calories/° C./cm./sec.) such a fuel element has a thermal stress limitation on the temperature at which it can be operated. A loose aggregate of such coated particles in a container tube has no thermal stress limitation affecting its temperature of operation but the temperature at which the fuel element can be operated is limited because of the poor thermal conductivity of the loose aggregate of coated particles. For example a 60 volume percent loose aggregate of 620 micron diameter pyrolytic carbon coated uranium carbide particles only has a thermal conductivity of 0.002 calories/° C./cm./sec. in vacuum and the thermal conductivity only rises to 0.008 calories/° C./cm./sec. in helium.

A fuel element in accordance with the present invention is free from thermal stress limitations and also has a much better thermal conductivity than can be obtained in a loose aggregate of particles. The improved thermal conductivity is obtained due to the particles being bonded together at their points of contact by a bridge of bonding material of high thermal conductivity. For example in a fuel element produced by the method described above and comprising 650 micron diameter pyrolytic carbon coated uranium carbide particles bonded together about the region of their points of contact by a silicon metal/ silicon carbide bond a thermal conductivity of 0.017– 0.022 calories/° C./cm./sec. is obtained. The bonding together of coated particles by a material such as carbon is possible for example by coating the particles with a carbonisable resin and then heating an aggregate of the coated particles to carbonise the resin. Although a fuel element comprising an aggregate of such coated particles in a container would be free of thermal stress limitations the thermal conductivity of the aggregate of coated particles would be low. This is because the particles will only be bonded in point to point contact and the bonding carbon will be of low density and hence of low thermal conductivity. Typically a thermal conductivity of only 0.008 calories/° C./cm./sec. will be obtained in such a fuel element.

We claim:

1. A nuclear fuel element comprising particles of ceramic fissile material, each having a coating of non fissile ceramic material, the particles being contained in an outer container and the particles being bonded together in a region about each of their points of contact in the container by an individual bridge of refractory metal of high thermal conductivity the interspaces between the particles being free of refractory metal.

2. A nuclear reactor fuel element as claimed in claim 1 wherein the particles are bonded together in the region about each of their points of contact by an individual bridge of a refractory metal which is reactive with the coating of non fissile ceramic material on the particles, whereby a bond of ceramic material is formed between the particles at their points of contact, by reaction of the refractory metal with said coating, in addition to the bond provided by the bridge of refractory metal in the region about each of the points of contact of the particles.

3. A nuclear fuel element as claimed in claim 1 wherein the particles are of uranium carbide each having a coating of pyrolytically deposited carbon and the particles are bonded together in the region about each of their points of contact by an individual bridge of silicon metal.

4. A nuclear reactor fuel element as claimed in claim 1 wherein the particles are of uranium carbide each having a coating of pyrolytically deposited carbon and the particles are bonded together in the region about each of their points of contact by an individual bridge of silicon metal and at their points of contact by silicon carbide formed by reaction between the silicon metal and the coating of pyrolytically deposited carbon on the particles.

5. A nuclear reactor fuel element as claimed in claim 1 wherein the outer container is of ceramic material.

6. A nuclear reactor fuel element as claimed in claim 1 wherein the outer container is of silicon carbide.

7. A nuclear reactor fuel element comprising particles of ceramic fissile material each having a coating of pyrolytic carbon, the particles being contained in an outer container and the particles being bonded together in a region about each of their points of contact in the container by an individual bridge of metal selected from the group consisting of silicon, zirconium, niobium and molybdenum, the interspaces between the particles being free of metal.

8. A nuclear reactor fuel element as claimed in claim 7 wherein the particles are bonded together in the region about each of their points of contact by an individual bridge of metal selected from the group consisting of silicon, zirconium, niobium and molybdenum and also by a bond of a carbide of the metal at their points of contact said bond of carbide of the metal being formed by reaction between the pyrolytic carbon coating on the particles and the metal forming the bridge between the particles about each of their points of contact.

9. A nuclear reactor fuel element as claimed in claim 7 wherein the outer container is of ceramic material.

10. A nuclear reactor fuel element as claimed in claim 7 wherein the outer container is of silicon carbide.

11. A nuclear reactor fuel element comprising particles of ceramic fissile material each having a coating of non-fissile ceramic material the particles being contained in an outer container and the particles being bonded together in a region about each of their points of contact in the container by an individual bridge of refractory metal the interspaces between the particles being free of refractory metal.

12. A nuclear reactor fuel element as claimed in claim 11 wherein the particles are bonded together in the region about each of their points of contact by an individual bridge of refractory metal which is reactive with the coating of non-fissile ceramic material on the particles, whereby a bond of ceramic material is formed between the particles at their points of contact by reaction of the refractory metal with said coating, in addition to the bond provided by the bridge of refractory metal in the region about each of the points of contact of the particles.

13. A nuclear reactor fuel element as claimed in claim 11 wherein the outer container is of ceramic material.

14. A nuclear reactor fuel element as claimed in claim 11 wherein the outer container is of silicon carbide.

15. A nuclear reactor fuel body comprising an agglomeration of particles of ceramic fissile material, each having a coating of non-fissile ceramic material, and the particles being bonded together in a region about each of their points of contact by an individual bridge of refractory metal of high thermal conductivity the interspaces between the particles being free of refractory metal.

16. A nuclear reactor fuel body as claimed in claim 15 wherein the particles are bonded together in the region about each of their points of contact by an individual bridge of a refractory metal which is reactive with the coating of non-fissile ceramic material on the particles, whereby a bond of ceramic material is formed between the particles at their points of contact, by reaction of the refractory metal with said coating, in addition to the bond provided by the bridge of refractory metal in the region about each of the points of contact of the particles.

17. A nuclear fuel body as claimed in claim 15 wherein the particles are of uranium carbide each having a coating of pyrolytically deposited carbon and the particles are bonded together in the region about each of their points of contact by an individual bridge of silicon metal.

18. A nuclear reactor fuel body as claimed in claim 15 wherein the particles are of uranium carbide each having a coating of pyrolytically deposited carbon and the particles are bonded together in the region about each of their points of contact by an individual bridge of silicon metal and at their points of contact by silicon carbide formed by reaction between the silicon metal and the coating of pyrolytically deposited carbon on the particles.

19. A nuclear reactor fuel body comprising an agglomeration of particles of ceramic fissile material each having a coating of pyrolytic carbon the particles being bonded together in a region about each of their points of contact by an individual bridge of a metal selected from the group consisted of silicon, zirconium, niobium and molybdenum, the interspaces between the particles being free of metal.

20. A nuclear reactor fuel body as claimed in claim 19 wherein the particles are bonded together in the region about each of their points of contact by an individual bridge of metal selected from the group consisting of silicon, zirconium, niobium and molybdenum and also by a bond of a carbide of the metal at their points of contact, said bond of a carbide of the metal being formed by reaction between the pyrolytic carbon coating on the particles and the metal forming the bridge between the particles about each of their points of contact.

21. A nuclear reactor fuel body comprising an agglomeration of particles of ceramic fissile material each having a coating of non-fissile ceramic material the particles being bonded together in a region about each of their points of contact by an individual bridge of refractory metal the interspaces between the particles being free of refractory metal.

22. A nuclear reactor fuel body as claimed in claim 21 wherein the particles are bonded together in the region about each of their points of contact by an individual bridge of refractory metal which is reactive with the coating of non-fissile ceramic material on the particles whereby a bond of ceramic material is formed between the particles at their points of contact by reaction of the metal with said coating in addition to the bond provided by the bridge of refractory metal in the region about each of the points of contact of the particles.

References Cited

UNITED STATES PATENTS

| | | | |
|---|---|---|---|
| 3,122,595 | 2/1964 | Oxley | 176—69 X |
| 3,276,968 | 10/1966 | Ingleby | 176—91 X |

FOREIGN PATENTS 933,500  8/1963  Great Britain.

BENJAMIN R. PADGETT, Primary Examiner

MELVIN J. SCOLNICK, Assistant Examiner

U.S. Cl. X.R.

176—82, 91; 264—.5